US012766632B2

(12) United States Patent
Chen et al.

(10) Patent No.: US 12,766,632 B2
(45) Date of Patent: Oct. 20, 2026

(54) LINE-ILLUMINATION TEMPORAL FOCUSING 3D NANO-FABRICATION APPARATUS AND METHOD

(71) Applicant: Centre for Perceptual and Interactive Intelligence (CPII) Limited, Hong Kong (HK)

(72) Inventors: Shih-Chi Chen, Hong Kong (HK); Songyun Gu, Yuyao (CN); Qiuyuan Zhong, Hong Kong (HK)

( * ) Notice: Subject to any disclaimer, the term of this patent is extended or adjusted under 35 U.S.C. 154(b) by 134 days.

(21) Appl. No.: 18/467,170

(22) Filed: Sep. 14, 2023

(65) Prior Publication Data

US 2025/0091156 A1 Mar. 20, 2025

(51) Int. Cl.

| | |
|---|---|
| ***B23K 26/046*** | (2014.01) |
| ***B23K 26/03*** | (2006.01) |
| ***B23K 26/064*** | (2014.01) |
| ***B23K 26/08*** | (2014.01) |
| ***B33Y 10/00*** | (2015.01) |
| ***B33Y 30/00*** | (2015.01) |
| ***B33Y 40/00*** | (2020.01) |
| ***B33Y 50/02*** | (2015.01) |
| ***B82Y 40/00*** | (2011.01) |

(52) U.S. Cl.

CPC .......... *B23K 26/046* (2013.01); *B23K 26/032* (2013.01); *B23K 26/0643* (2013.01); *B23K 26/0861* (2013.01); *B33Y 10/00* (2014.12); *B33Y 30/00* (2014.12); *B33Y 50/02* (2014.12); *B33Y 40/00* (2014.12); *B82Y 40/00* (2013.01)

(58) Field of Classification Search

CPC ................ B23K 26/046; B23K 26/032; B23K 26/0643; B23K 26/0861; B23K 26/342; B23K 26/0624; B33Y 10/00; B33Y 30/00; B33Y 50/02; B33Y 40/00; B82Y 40/00; B22F 10/25; B22F 10/36; B22F 12/43; B22F 12/44; B22F 12/90; B29C 64/124; B29C 64/264; B29C 64/393

See application file for complete search history.

(56) References Cited

U.S. PATENT DOCUMENTS 7,088,432 B2 * 8/2006 Zhang ................ G03F 7/70291 427/512
7,902,526 B2 3/2011 Kim et al.
10,207,365 B2 2/2019 Chen et al.
10,875,247 B2 * 12/2020 Shusteff ................ B33Y 10/00
11,312,067 B2 4/2022 Saha et al.
2006/0215175 A1 * 9/2006 Yacoubian ......... G01N 21/9505 356/502

(Continued)

*Primary Examiner* — Nahida Sultana
(74) *Attorney, Agent, or Firm* — Egbert, McDaniel & Swartz, PLLC

(57) ABSTRACT

The present invention teaches an apparatus and method for line-illumination temporal focusing three-dimensional (3D) nano-fabrication, the apparatus and method comprising: a laser source (110) configured to emit a laser beam (111); a line-illumination pattern unit (150) forming a pre-determined line pattern from a line-shaped beam; a data acquisition unit (120) receiving input and transmitting output signals for movement synchronization of multiple devices; an optical imaging device (130) configured to monitor fabrication process in real time; a controller unit (140); and a substrate plane (170).

14 Claims, 6 Drawing Sheets

(56) References Cited

U.S. PATENT DOCUMENTS

| | | | | |
|---|---|---|---|---|
| 2006/0219676 | A1* | 10/2006 | Taylor | G02B 6/1225 219/121.69 |
| 2007/0152154 | A1* | 7/2007 | DeCamp | G01J 3/457 257/E27.15 |
| 2016/0199935 | A1* | 7/2016 | Chen | B23K 26/0624 219/121.61 |
| 2016/0320531 | A1* | 11/2016 | Kamali | G02B 1/002 |
| 2019/0126537 | A1* | 5/2019 | Saha | G03F 7/70258 |
| 2019/0273025 | A1* | 9/2019 | Chen | B23K 26/03 |
| 2021/0190669 | A1* | 6/2021 | Ota | G01N 15/1459 |
| 2021/0354243 | A1 | 11/2021 | Shibazaki | |
| 2022/0152924 | A1* | 5/2022 | Chen | B29C 64/106 |
| 2023/0204969 | A1* | 6/2023 | Sun | B23K 26/0006 219/121.69 |

* cited by examiner

LINE-ILLUMINATION TEMPORAL FOCUSING 3D NANO-FABRICATION APPARATUS AND METHOD

FIELD OF THE INVENTION

The present invention relates to a three-dimensional (3D) nano-fabrication apparatus and method, and more particularly to form a three-dimensional object on a target surface based on a line-illumination system. The 3D nanofabrication apparatus and method related to the present invention are applied to perform ultrafast three-dimensional nanofabricating or nano-printing with different projected patterns.

BACKGROUND OF THE INVENTION

Three-dimensional (3D) nanofabrication is an advanced form of additive manufacturing that involves creating 3D structures and objects at the nanoscale level. It combines principles from traditional 3D fabricating with techniques from nanotechnology to achieve an unprecedented level of precision and resolution. Nanoscale fabrication allows for the creation of intricate structures, devices, and materials with dimensions on the order of nanometres (billionths of a meter).

One of the primary goals of 3D nanofabrication is to achieve extremely high resolution, enabling the fabrication of intricate structures with details and features on the nanometer scale. Different techniques can be used for fabricating at nanoscale, such as two-photon lithography, electron beam lithography, focused ion beam (FIB) milling, and more, while only a few of them can generate true 3D structures directly. These techniques utilize focused beams of energy to manipulate and deposit materials at the nanoscale. Nanofabrication technologies allow for the precise deposition of materials, whether they are polymers, metals, ceramics, or other substances, at the nanoscale.

Temporal focusing (TF) is one of the optical techniques used in 3D nanofabrication systems as it involves manipulating the temporal profile (time duration) of a light pulse while keeping its spatial properties relatively unchanged. It has been proven to provide high-speed sub-micrometer fabrication capability, setting many world records in terms of the throughput, resolution, and material adaptability. However, the original TF fabrication system, i.e., femtosecond projection two-photon lithography (TPL) (described in U.S. Pat. No. 10,207,365 B2 and No. 11,312,067)—a 2D projection technique, requires an complex regenerative femtosecond (fs) laser amplifier of low repetition rate (e.g., 1 kHz) to provide sufficient pulse energy; the high patterning rate is achieved at the expense of complex exposure and laser tuning procedure; for example, its axial feature size and intensity vary with different projected patterns, making structure optimization challenging.

Generally, temporally focusing of a laser can be achieved by (1) stretching the laser pulse in the time domain, and (2) compressing the pulse to increase the peak intensity only at the desired plane. In an original TF setup, i.e., a wide-field TF design, the pulse stretching is realized by a dispersion component, e.g., a diffraction grating or a digital micromirror device (DMD). In a DMD-based TF system, a femtosecond (fs) laser is first dispersed by the DMD. As different spectral components of the fs laser travel through different distances in space, the phases for different spectral components are mismatched, resulting in pulse stretching. When the dispersed spectral components propagate to the objective lens, the dispersed components are recombined to cancel out the phase mismatch, thereby compressing the pulse to its original width. As the phases of different spectral components are only re-matched at the focal plane, while the pulse remains stretched both before and after this plane, a temporally focused light sheet is generated at the focal plane.

U.S. Pat. No. 7,902,526 B2 discloses an imaging system that includes an optical pulse generator for providing an optical pulse having a spectral bandwidth and includes monochromatic waves having different wavelengths. A dispersive element receives a second optical pulse associated with the optical pulse and disperses the second optical pulse at different angles on the surface of the dispersive element depending on wavelength. One or more focal elements receives the dispersed second optical pulse produced on the dispersive element. The one or more focal element recombine the dispersed second optical pulse at a focal plane on a specimen where the width of the optical pulse is restored at the focal plane. While the said invention may have disclosed the use of a pulsed laser to produce either spatial or temporally focused light beam, eventually producing fluorescence 2D images, it is a conventional method to fabricate 2D/3D images with slower fabrication rate. In addition, the mentioned art uses a fixed diffraction component (a grating) and an additional pattern generator to achieve the same temporal focusing projection effect described in U.S. Pat. No. 10,207,365 B2 and No. 11,312,067.

US20210354243A1 employs a directed energy deposition (DED)-type shaping system which involves beam irradiation, material supply, movement systems wherein a DMD is also adapted to detect the state of each mirror element based on the intensity distribution of the reflection light. However, it is to note that DED-based processes are prone to distortion, high porosity and inhomogeneities with formation of 3D objects with low quality, low accuracy, and limited (tens of micrometer-level) resolution. Furthermore, it requires expensive materials and takes longer production time.

While 3D nanofabricating holds immense promise, it also presents challenges due to the incredibly small scales involved. Apart from costs, ensuring proper material properties, handling forces at the nanoscale, and developing precise control over the printing process are some of the challenges to be overcome.

SUMMARY OF THE INVENTION

It is an objective of the present invention to provide a line-illumination temporal focusing 3D nano-fabrication apparatus and method for fabricating an object at a high throughput and controlled laser exposure level while maintaining high resolution based on line-illumination temporal focusing fabrication.

Another objective of the present invention is to eliminate the needs and errors from stitching due to the fabricating of large objects.

It is also an objective of the present invention to minimize nano-fabrication costs with a less bulky printing system with robust applications.

Accordingly, these objectives can be achieved by following the teachings of the present invention, which relates to a line-illumination temporal focusing three-dimensional (3D) nano-fabrication apparatus, the apparatus comprising: a laser source configured to emit a laser beam; a line-illumination pattern unit configured form a pre-determined line pattern from a line-shaped beam; a data acquisition unit configurable to receive input and transmit output signals for movement synchronization of multiple devices; an optical imaging device configured to monitor fabrication process in real time; a controller unit; and a substrate plane.

Additionally, the above objectives can be achieved the following a method of three-dimensional (3D) nano-fabricating using a line-illumination temporal focusing 3D nano-fabrication apparatus, the method comprising: (a) generating a series of line patterns from a 3D model; (b) configuring the 3D nano-fabrication apparatus by loading the generated series of line patterns into a memory of a dispersion device in the apparatus; (c) moving a substrate plane that is attached to a sample stage at the focal plane of an objective lens; (d) initiating fabrication process by a controller unit wherein a laser beam is emitted from a laser source, passing through an open shutter into a line-illumination unit while the sample stage and a dispersion device moves in synchronization of which is synchronized by a data acquisition unit and continuously move in synchronization in a parallel motion; and (e) completing the fabrication process and once completed, the sample stage returns to its original position, memory of the dispersion device (220) is cleared and the shutter is off.

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
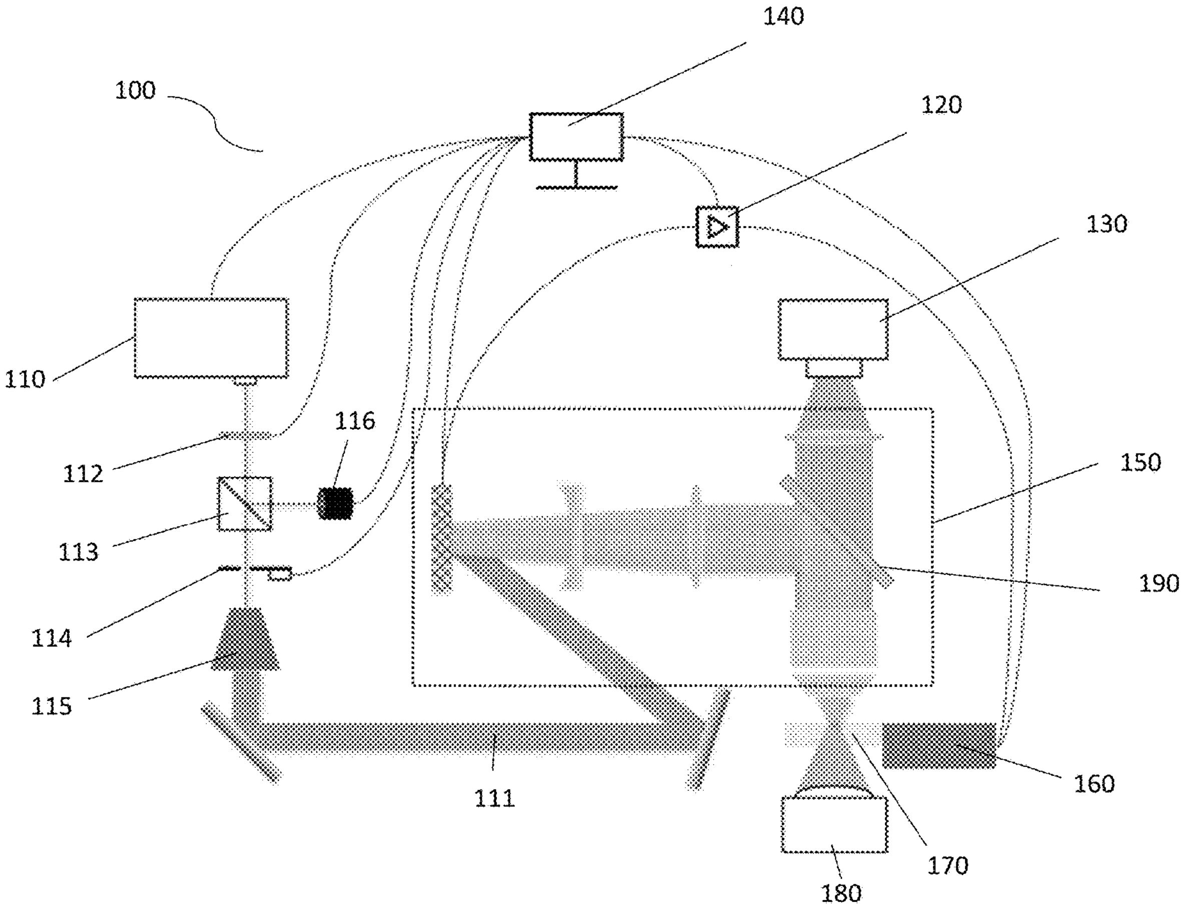
FIG. 1 illustrates an overall view of a three-dimensional (3D) nano-fabrication apparatus.

For the purposes of promoting and understanding the principles of the invention, reference will now be made to the embodiments illustrated in the drawings and described in the following written specification. It is understood that the present invention includes any alterations and modifications to the illustrated embodiments and includes further applications of the principles of the invention as would normally occur to one skilled in the art to which the invention pertains.

The present invention teaches a line-illumination temporal focusing three-dimensional (3D) nano-fabrication apparatus (100), the apparatus comprising: a laser source (110) emitting a laser beam (111); a line-illumination pattern unit (150) forming a pre-determined line pattern from a line-shaped beam; a data acquisition unit (120) receiving input and transmitting output signals for movement synchronization of multiple devices; an optical imaging device (130) configured to monitor fabrication process in real time; a controller unit (140); and a substrate plane (170). An overall view of the present invention is further illustrated in FIG. 1.

In one of the embodiments of the present invention, wherein the multiple devices synchronized by the acquisition unit (120) are a sample stage (160) and the dispersion device (220) in the line-illumination pattern unit (150), wherein, the acquisition unit (120) receives input signals from the sample stage (160) and transmits output signals to the dispersion device (220) in the line-illumination pattern unit (150) for movement synchronization during fabrication process.

In one of the embodiments, for a fabrication of a transparent object, an illumination light (180) is placed below a sample on the substrate plane wherein an LED light is an example of the illumination light. The illumination light (180) is further reconfigurable to be epi-illuminated for an opaque or less transparent object. Other types of illumination lights may be applied, depending on the transparency of the object to be printed.

In another embodiment, the optical imaging device (130) is a 2D imaging sensor selected from a group of complementary metal-oxide-semiconductor (CMOS) camera and a CCD camera. For example, a CMOS camera may be employed to monitor the fabrication process in situ, is built in conjunction with the fabrication system and placed at the conjugate plane of the objective lens's focal plane.

In another embodiment of the present invention, the laser source (110) is a femtosecond (fs) laser. The fs laser has a workable center wavelength ranging from 400 nm-2000 nm with a wide range of repetition rate i.e., 1 kHz-200 MHz, and a pulse width of <150 fs is used as the light source.

Figure 2:
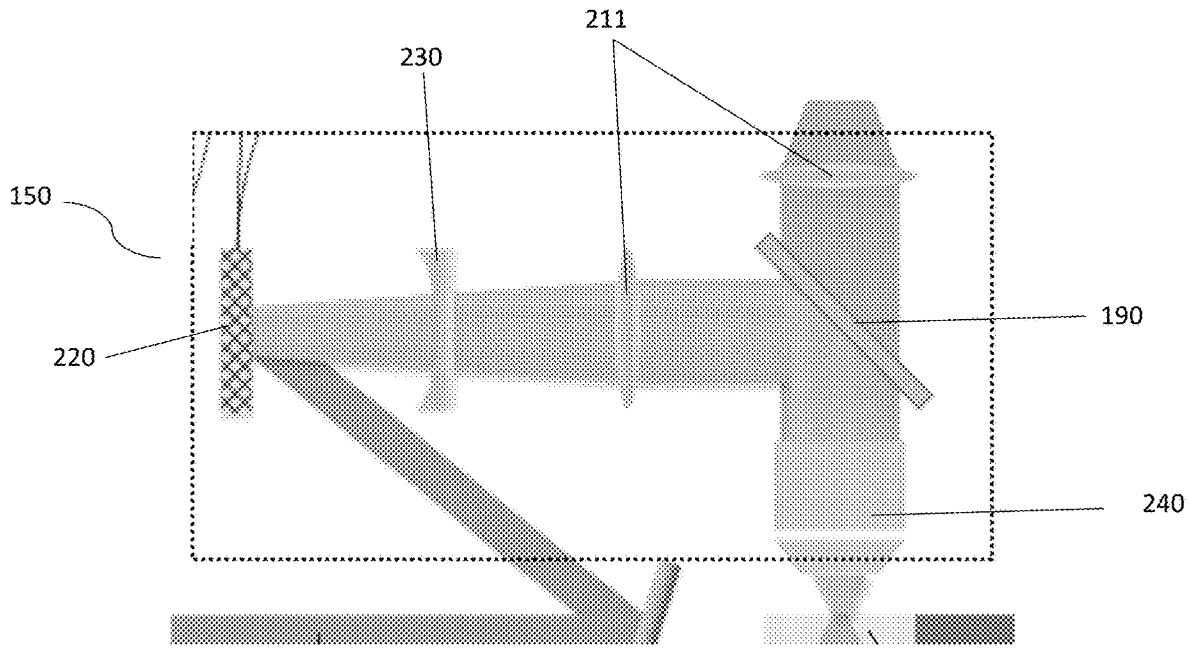
FIG. 2 illustrates an arrangement of a dispersion device.

In one of the embodiments, the line-illumination pattern unit (150) further comprises: a dispersion device (220) with a pre-determined intensity; a shaping lens (230) arranged in adjacent to the dispersion device (220), forming a line-shaped beam; and, a 4-f imaging system to relay the line-shaped beam and focus the laser beam onto a focal plane of an objective lens (240), forming the pre-determined line pattern on the substrate plane (170). More particularly, the laser beam is spatially focused on a Y-Z plane and temporally focused on an X-Z plane of the focal plane of the objective lens which together generates a 3D resolved intensity-programmable line. A close-up view of this embodiment is further illustrated in FIG. 2.

In another embodiment, the shaping lens (230) is a cylindrical lens, and the 4-f imaging further comprises at least one collimator (211) and the objective lens (240).

In another embodiment, the sample stage (160) is configured to move in X-Y-Z directions and is programmable by the control unit (140) to output trigger signals for the data acquisition unit (120) for movement synchronization during fabrication.

There is a data acquisition unit (120) which inputs trigger signals from the sample stage (160) and outputs switching signals to the dispersion device (220) for pattern switching.

The data acquisition unit is also reprogrammable to input signals for arbitrary line structures.

In another embodiment of the present invention, the controller unit (140) is a computer wherein the computer is configured to control laser source's power, shutter (114), the dispersion device's trigger mode, samples loading into the dispersion's memory, motion and trigger of the sample stage (160).

In order to produce spatially and temporally laser beam upon emission, the laser beam (111) expands via a 2×-20× beam expander (115) to fill aperture of the dispersion device (220). It is further described in the present invention that the dispersion device (220) is an array of micromirrors or digital micromirror device (DMD) wherein the beam is illuminated onto the DMD chip on the x-z plane and this is illustrated in the upper image of FIG. 3A.

In another embodiment wherein the laser beam (111) is dispersed by the dispersion device (220), entering the cylindrical lens (f=−100 mm) which is placed with a distance of its focal length, and the at least one collimator (f=200 mm) (211), then reflected by a dichroic mirror (190), and lastly enters the objective lens (40× Oil, NA=1.3) (240) to be spatially and temporally focused into the pre-determined line pattern.

Figure 3:
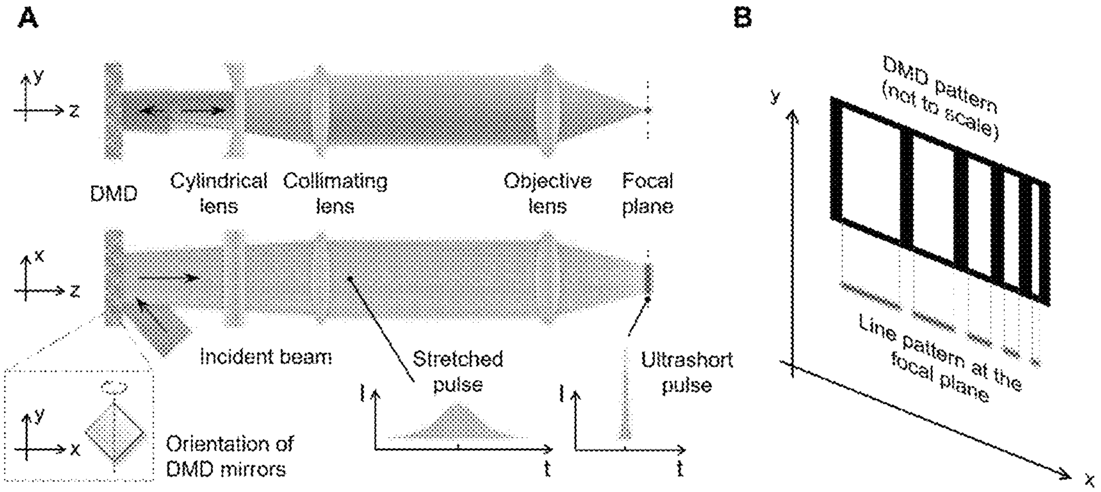
FIG. 3 illustrates the principle of the line-illumination TF system: (A) y-z, x-z, and y-x views of the TF system. The rotational axis of the DMD mirrors is parallel to the y-axis, which induces dispersion in the x-z plane while keeping the beam non-modulated in the y-z plane. The fs laser beam is stretched in the time domain after the DMD and is then temporally (i.e., x-z plane) and spatially (i.e., y-z plane) focused into an intensity programmable-line at the focal plane of the objective lens; (B) spatially and temporally focused line pattern in the x-y plane and the corresponding DMD pattern.

More particularly, in the X-Z view, one may observe the fs laser is also dispersed by the DMD (i.e., the spectral components are dispersed along the X-axis); as such, the pulses are widened. After the 4-f system, the dispersed laser spectral components are recombined and temporally focused at the focal plane of the objective lens into a line pattern, as illustrated in FIG. 3B. Note that the intensity distribution along the line is controlled by the pattern displayed on the DMD, and the length of each vertical stripe on the DMD determines the line intensity of each line segment, as illustrated in FIG. 3B.

Figure 6:
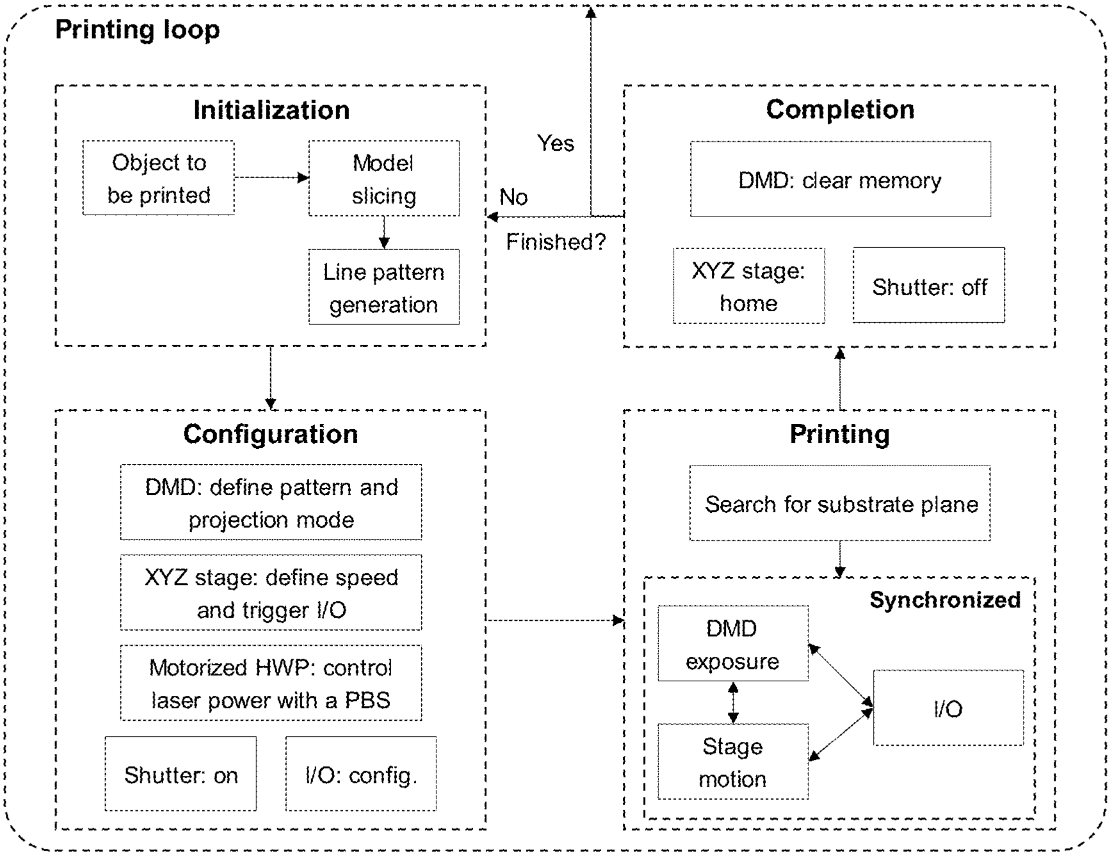

Another aspect of the present invention wherein the present invention also teaches a method (300) of three-dimensional (3D) nano-fabricating using a line-illumination temporal focusing 3D nano-fabrication apparatus (100), the method comprising: (a) generating a series of line patterns from a 3D model; (b) configuring the 3D nano-fabrication apparatus (100) by loading the generated series of line patterns into a memory of a dispersion device (220) in the apparatus (100); (c) moving a substrate plane (170) that is attached to a sample stage (160) at the focal plane of an objective lens (240); (d) initiating fabrication process by a controller unit (140) wherein a laser beam (111) is emitted from a laser source (110), passing through an open shutter (114) into a line-illumination unit (150) while the sample stage (160) and a dispersion device (220) moves in synchronization of which is synchronized by a data acquisition unit (120) and continuously move in synchronization in a parallel motion; and (e) completing the fabrication process and once completed, the sample stage (160) returns to its original position, memory of the dispersion device (220) is cleared and the shutter (140) is off. This is further illustrated in FIG. 6.

In another embodiment of the present invention wherein repeating steps (a) to (d) is required in order to continue fabrication process until all structures are fabricated and once completed, the sample stage (160) returns to its original position, memory of the dispersion device is cleared and the shutter (140) is off.

In another embodiment, the method of configuring the 3D nano-fabrication apparatus (100) from step (b) further comprising: defining line patterns and trigger mode of the dispersion device (220); defining speed of the sample stage (160) and outputting trigger signals for the data acquisition unit (120); determining laser power by a half wave plate (HWP) (112) and a polarization beam splitter (113); switching on the shutter (114); and configuring the data acquisition unit (120) to synchronize the sample stage (160) and the dispersion device (220) during the fabrication process.

In another embodiment, adjusting line intensity of the sample in the dispersion device (220) and the sample stage (160) velocity could control laser illumination dose.

In a further embodiment, the dispersion device (220) is an array of micromirrors or digital micromirror device (DMD) wherein each line pattern generated from step (a) further comprising any number of line segments having different grayscale intensities and lengths of which the number and length of the line segments is determined by the number and width of the vertical stripes on the DMD. The intensity of corresponding line segment is determined by the length of the vertical stripes on the DMD.

In another embodiment of the present invention, wherein the laser beam (111) emitted from step (d) is reflected by a plurality of reflective mirrors then disperses via the DMD, then enters the concave cylindrical lens and the at least one collimator (211), then is further reflected by a dichroic mirror (190), and lastly enters the objective lens (240) to be spatially and temporally focused into the pre-determined line pattern.

In another embodiment of the present invention, the data acquisition unit (120) allows movement synchronization of multiple devices. For example, the data acquisition unit (120) receives input trigger signals from the sample stage (160) and transmit output switching signals to the DMD for pattern switching.

EXAMPLES

Throughput

To estimate the fabrication rate based on the present invention, the size of the DMD chip is 20.74 mm×11.67 mm, which corresponds to a focal line length ($L_{line}$) of 518.5 μm. ($L_{line}=L_{DMD}$/Mag=(20.74 mm)/40=518.5 μm.) The stage has a speed of $v_{max}$=200 mm/s. By setting the layer height to 2 μm, the maximum printing rate is $T_{vmax}$=200 mm/s×518.5 μm×2 μm=0.21 $mm^3$/s=747 $mm^3$/hr.

In the event that a high-resolution structure is desired, the stage motion artifacts need to be considered, which may reduce the fabrication rate slightly. In the present invention, the DMD (V-9501) has a pattern rate of 18 kHz. To avoid motion errors, i.e., motion errors<PSF≈300 nm, the speed of the stage should be limited to v=300 nm×18 kHz=5.4 mm/s. In this case, the printing rate becomes $T_v$=5.4 mm/s×518.5 μm×2 μm=5.6×$10^{-3}$ $mm^3$/s=20.16 $mm^3$/hr.

In both cases, the fabrication rate is comparable with existing inventions with a low-cost laser source, and 3 orders of magnitude higher than state-of-the-art commercial solutions.

Uniformity and Grayscale Control

Light from a fs laser source has a Gaussian profile; and to achieve optimal fabrication results, the laser beam needs to be shaped into a flattop profile, which can be challenging and often results in a complex setup. Yet, this can be easily achieved in the present invention, i.e., by changing patterns displayed on the DMD (or length of each vertical strips in FIG. 3B), the intensity at each position on the line pattern can be precisely controlled, as illustrated in FIGS. 4A-B.

Figure 4:
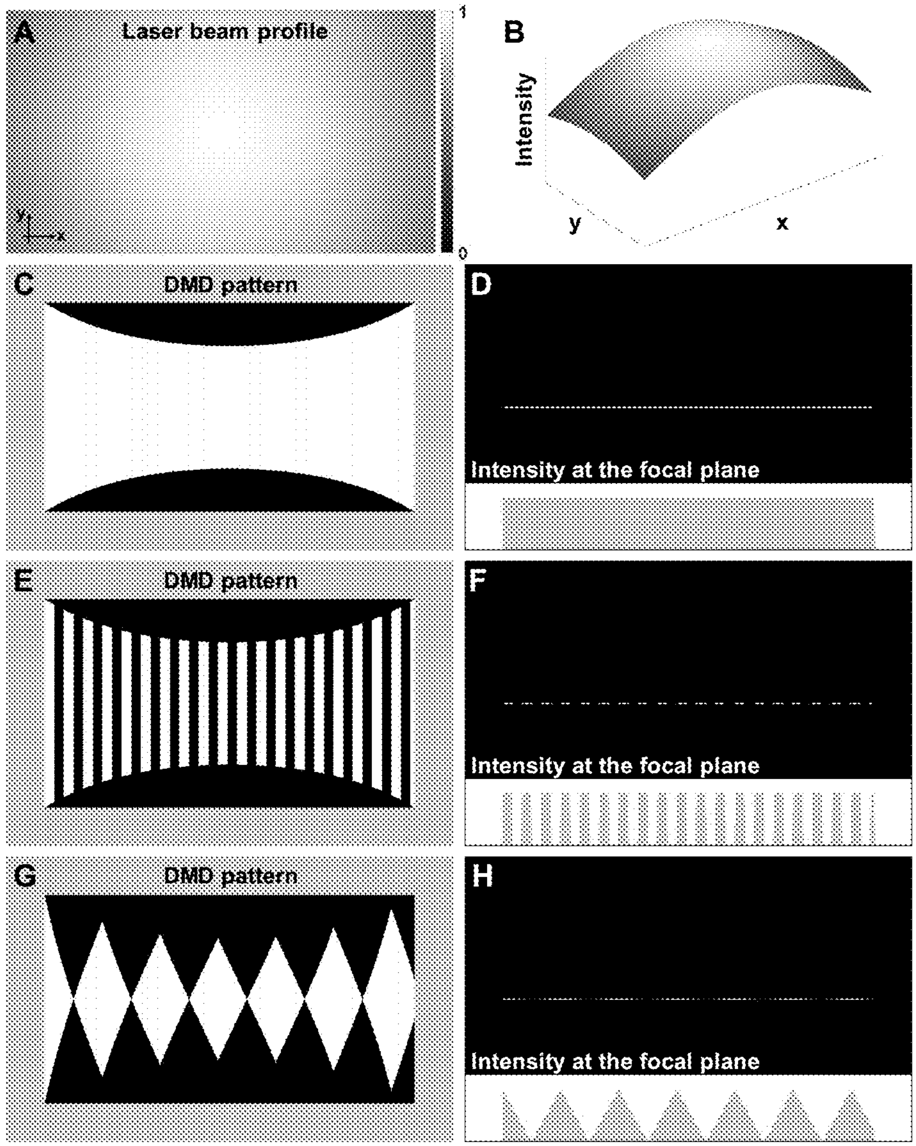
FIG. 4 illustrates grayscale control and correction of non-uniform illumination: (A) typical Gaussian laser beam profile; (B) beam profile in (A) cropped by the DMD aperture; (C, E, G) 2D DMD patterns with intensity pre-compensation to generate the designed line patterns in (D, F, H) respectively.

FIGS. 4A-B show a typical 2D laser intensity (Gaussian) profile, which is non-uniform. Yet, this will not influence the precision of the present invention; and high resolution and highly uniform fabrication results can be directly achieved by slightly modifying the 2D DMD patterns. FIGS. 4C and 4E present the intensity pre-compensated 2D DMD patterns, and FIGS. 4D and 4F show the simulation results of the desired illumination line pattern, which are highly uniform.

To demonstrate precision of grayscale control using the Gaussian input beam, FIGS. 4G and 4H, respectively, present the designed intensity pre-compensated 2D DMD patterns and the simulated illumination line pattern, where precisely controlled gray scale illumination can be clearly observed in the sawtooth profile in the bottom of FIG. 4H.

The precision of the grayscale control is on the level of 0.1%, which is determined by the number of pixels in the y-axis of the DMD.

Figure 5:
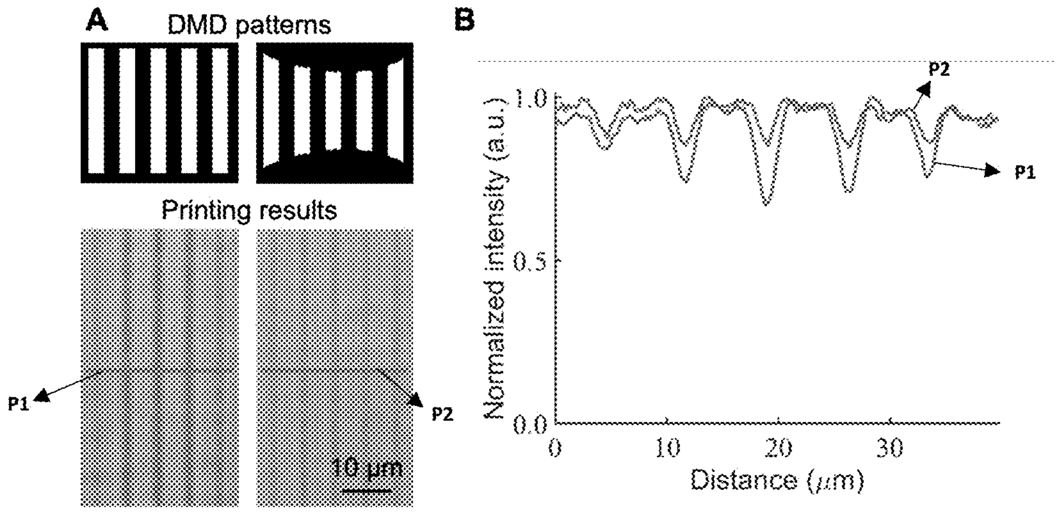
FIG. 5 illustrates results of a line-illumination without and with grayscale control: (A) 2D DMD patterns without (top left) and with (top right) intensity pre-compensation; and the corresponding printing results (bottom); (B) measured profiles of the fabricated structures without (P1) and with (P2) intensity pre-compensation, where the P2 curve shows significantly improved uniformity; and, FIG. 6 illustrates the fabrication process using the 3D nano-fabrication apparatus.

Analytical models were developed to verify the concept of the present invention wherein FIGS. 5A-B present the fabrication results of system without and with intensity pre-compensation. The light source has a Gaussian beam profile. From FIG. 5B, one may observe clearly that uniformity of the fabricated strips have been significantly improved. The results were fabricated at a rate of 100 $mm^3$/hr.

The present invention shows immense market potential in large-scale 3D nanofabrication, which has a broad range of applications in photonics, material design, biomedicine, and semiconductor. It will benefit both the scientific and industrial communities by providing a more capable 3D nanoprinting platform in terms of speed, rate, cost, and flexibility. With over 3 orders of magnitude enhancement in the printing speed, this invention can reduce the cost for nanofabrication substantially. It also provides a robust and facile exposure strategy that can be used in different application scenarios, e.g., grayscale printing for tuning the refractive index of photonic devices. Uniform and large-scale complex 3D structures can be fabricated at scale, which promises the rapid prototyping and mass production of functional 3D nanostructures and devices, e.g., mechanical metamaterials and reconfigurable architectures.

The present invention explained above is not limited to the aforementioned embodiment and drawings, and it will be obvious to those having an ordinary skill in the art of the prevent invention that various replacements, deformations, and changes may be made without departing from the scope of the invention.

What is claimed:

1. A line-illumination temporal focusing three-dimensional nano-fabrication apparatus comprising:

a femtosecond laser source adapted to emit a femtosecond laser beam;

a line-illumination pattern unit that forms a pre-determined pattern from a line-shaped beam, said line-illumination pattern unit having a dispersion device comprising a digital micromirror device of a predetermined intensity and a concave cylindrical lens adjacent to the dispersion device so as shape the laser beam in a single dimension to form the line-shaped beam and to generate a virtual line pattern optically conjugated to a focal plane;

a data acquisition unit that receives input signals and transmits output signals for movement synchronization of multiple devices;

an optical imaging device configured to monitor a fabrication process in real-time;

a controller unit; and a substrate plane.

2. The line-illumination temporal focusing three-dimensional nano-fabrication apparatus of claim 1, wherein the multiple devices synchronized by said data acquisition unit include a sample stage and a dispersion device in said line-illumination pattern unit, wherein said data acquisition unit receives signals from the sample stage and transmits output signals to the dispersion device in said line-illumination pattern unit for movement synchronization with a continuous movement of the sample stage during the fabrication process.

3. The line-illumination temporal focusing three-dimensional nano-fabrication apparatus of claim 1, further comprising:

an illumination light positioned below a sample on said substrate plane for fabrication of a transparent object.

4. The line-illumination temporal focusing three-dimensional nano-fabrication apparatus of claim 3, wherein said illumination light is reconfigurable so as to be epi-illuminated for an object less transparent than the transparent object.

5. The line-illumination temporal focusing three-dimensional nano-fabrication apparatus of claim 1, wherein said optical imaging device is a two-dimensional imaging sensor that is a complementary metal-oxide-semiconductor camera.

6. The line-illumination temporal focusing three-dimensional nano-fabrication apparatus of claim 1, wherein said optical imaging device is a two-dimensional imaging sensor that is a CCD camera.

7. The line-illumination temporal focusing three-dimensional nano-fabrication apparatus of claim 1, said line-illumination pattern unit further comprising:

a 4-f imaging system that relays the line-shaped beam and focuses the laser beam onto a focal plane of an objective lens so as to form the pre-determined line pattern on the substrate plane.

8. The line-illumination temporal focusing three-dimensional nano-fabrication apparatus of claim 7, said 4-f imaging system having at least one collimator and an objective lens.

9. The line-illumination temporal focusing three-dimensional nano-fabrication apparatus of claim 2, wherein the sample stage is configured to move in X-Y-Z directions and is programmable by said control unit so as to output trigger signals for said data acquisition unit for synchronization during fabrication.

10. The line-illumination temporal focusing three-dimensional nano-fabrication apparatus of claim 1, wherein the laser beam expands via a beam expander so as to fill an aperture of the dispersion device.

11. The line-illumination temporal focusing three-dimensional nano-fabrication apparatus of claim 1, wherein said data acquisition unit is reprogrammable to input signals for arbitrary line structures.

12. The line-illumination temporal focusing three-dimensional nano-fabrication apparatus of claim 2, wherein said data acquisition unit is reprogrammable to input signals for arbitrary line structures.

13. The line-illumination temporal focusing three-dimensional nano-fabrication apparatus of claim 2, wherein said controller unit is a computer.

14. The line-illumination temporal focusing three-dimensional nano-fabrication apparatus of claim 13, wherein the computer is configured to control a power shutter of said laser source and a trigger mode of the dispersion device and a loading of a sample into a memory of the dispersion device and a motion and trigger of the sample stage.

* * * * *